United States Patent
Delehouze et al.

(10) Patent No.: US 12,509,767 B2
(45) Date of Patent: Dec. 30, 2025

(54) ADDITIVE MANUFACTURING PROCESS FOR PRODUCING A STRUCTURE

(71) Applicant: SAFRAN CERAMICS, Le Haillan (FR)

(72) Inventors: Arnaud Delehouze, Moissy-Cramayel (FR); Eric Bouillon, Moissy-Cramayel (FR); Stéphane Roger André Goujard, Moissy-Cramayel (FR); Marc Montaudon, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 434 days.

(21) Appl. No.: 18/019,693

(22) PCT Filed: Jul. 9, 2021

(86) PCT No.: PCT/FR2021/051281
§ 371 (c)(1),
(2) Date: Feb. 3, 2023

(87) PCT Pub. No.: WO2022/029377
PCT Pub. Date: Feb. 10, 2022

(65) Prior Publication Data
US 2024/0254622 A1    Aug. 1, 2024

(30) Foreign Application Priority Data

Aug. 6, 2020 (FR) ........................ 2008320

(51) Int. Cl.
*C23C 16/44* (2006.01)
*B33Y 10/00* (2015.01)
(Continued)

(52) U.S. Cl.
CPC .......... *C23C 16/4418* (2013.01); *B33Y 10/00* (2014.12); *C04B 35/62884* (2013.01);
(Continued)

(58) Field of Classification Search
CPC ................................................ C23C 16/4418
See application file for complete search history.

(56) References Cited

U.S. PATENT DOCUMENTS 9,896,385 B2 * 2/2018 Harrison .................. D01F 9/08
10,475,689 B2 * 11/2019 Schmidt .............. H01L 21/6838
(Continued)

FOREIGN PATENT DOCUMENTS

CN    106390198 A    2/2017
CN    106862563 A    6/2017
(Continued)

OTHER PUBLICATIONS

Mohammad Vaezi et al: "A review on 3D micro-additive manufacturing technologies", The International Journal of Advanced Manufacturing Technology, vol. 67, No. 5-8, Jul. 2013, pp. 1721-1754, XP055170177 (Year: 2013).*

(Continued)

*Primary Examiner* — Xiao S Zhao
*Assistant Examiner* — Nicholas J Chidiac
(74) *Attorney, Agent, or Firm* — Pillsbury Winthrop Shaw Pittman LLP

(57) ABSTRACT

A method for manufacturing a structure by an additive manufacturing technique implementing a chemical vapor deposition assisted by focused energy radiation, includes the formation of a reinforcement which comprises a plurality of interconnected reinforcing elements made of ceramic or carbon, which define therebetween an interstitial volume having a tortuous shape along the deposition axis.

11 Claims, 3 Drawing Sheets

(51) Int. Cl.
    *C04B 35/628*     (2006.01)
    *C04B 35/80*     (2006.01)
    *F01D 5/14*     (2006.01)
    *F01D 5/28*     (2006.01)

(52) U.S. Cl.
    CPC .............. *C04B 35/80* (2013.01); *F01D 5/147* (2013.01); *F01D 5/28* (2013.01); *F01D 5/284* (2013.01); *C04B 2235/5248* (2013.01); *C04B 2235/614* (2013.01); *C04B 2235/665* (2013.01); *F05D 2230/22* (2013.01); *F05D 2230/234* (2013.01); *F05D 2230/31* (2013.01); *F05D 2230/314* (2013.01); *F05D 2250/313* (2013.01); *F05D 2300/2282* (2013.01); *F05D 2300/6033* (2013.01)

(56) References Cited

U.S. PATENT DOCUMENTS

| | | | |
|---|---|---|---|
| 10,549,505 B2* | 2/2020 | Tibbits | B32B 3/266 |
| 12,006,605 B2* | 6/2024 | Pegna | G21C 21/02 |
| 2006/0223312 A1 | 10/2006 | Yonker et al. | |
| 2014/0328964 A1 | 11/2014 | Mark et al. | |
| 2016/0347672 A1* | 12/2016 | Harrison | C04B 35/6229 |
| 2017/0165748 A1 | 6/2017 | Kamachi et al. | |
| 2017/0361600 A1 | 12/2017 | Bandyopadhyay et al. | |
| 2017/0369998 A1* | 12/2017 | Pegna | B32B 5/04 |
| 2018/0148864 A1 | 5/2018 | Harrison et al. | |
| 2018/0194106 A1* | 7/2018 | Tibbits | B32B 3/266 |
| 2018/0211861 A1* | 7/2018 | Schmidt | H01L 21/6833 |
| 2018/0369912 A1 | 12/2018 | Gold | |
| 2021/0087726 A1* | 3/2021 | Pegna | B33Y 70/00 |
| 2022/0250992 A1 | 8/2022 | Lacombe et al. | |

FOREIGN PATENT DOCUMENTS

| | | |
|---|---|---|
| CN | 108698126 A | 10/2018 |
| CN | 109109314 A | 1/2019 |
| CN | 114096500 A | 2/2022 |
| FR | 3 057 864 A1 | 4/2018 |
| JP | S63-278835 A | 11/1988 |
| WO | WO 2017/100695 A1 | 6/2017 |
| WO | WO 2021/061268 A1 | 4/2021 |

OTHER PUBLICATIONS

International Search Report as issued in International Patent Application No. PCT/FR2021/051281, dated Oct. 14, 2021.

Anonymous, "Ultra-Thin 3-D Ceramic Matrix Composite Cladding," SBIR.gov, Jul. 2019, Retrieved from the Internet: URL:https://www.sbir.gov/sbirsearch/detail/1640221 [Retrieved on Mar. 26, 2021], XP055790508, 2 pages.

Duty C., et al., "Laser chemical vapour deposition: materials, modelling, and process control," International Materials Reviews, vol. 46, No. 6, Jun. 2001, XP055789368, Retrieved from the Internet: URL:https://www.tandfonline.com/doi/pdf/10.1179/095066001771048727?needAccess=true, pp. 271-287.

Vaezi, M., et al., "A review on 3D micro-additive manufacturing technologies," The International Journal of Advanced Manufacturing Technology, vol. 67, No. 5-8, Jul. 2013, XP055170177, 34 pages.

Neall, R., et al., "Application of Selective Area Laser Deposition to the Manufacture of SiC-SiC Composite Nuclear Fuel Cladding," Ceramic Engineering and Science Proceedings, vol. 37, Issue 611, In: 11 Ceramic Materials for Energy Applications VI: Ceramic Engineering and Science Proceedings, vol. 37, Issue 611, Feb. 2017, XP055790277, 12 pages.

Zocca, A., et al., "SiOC ceramics with ordered porosity by 3D-printing of a preceramic polymer," J. Mater. Res., vol. 27, No. 17, Sep. 14, 2013, pp. 2243-2252.

* cited by examiner

[Fig. 1]
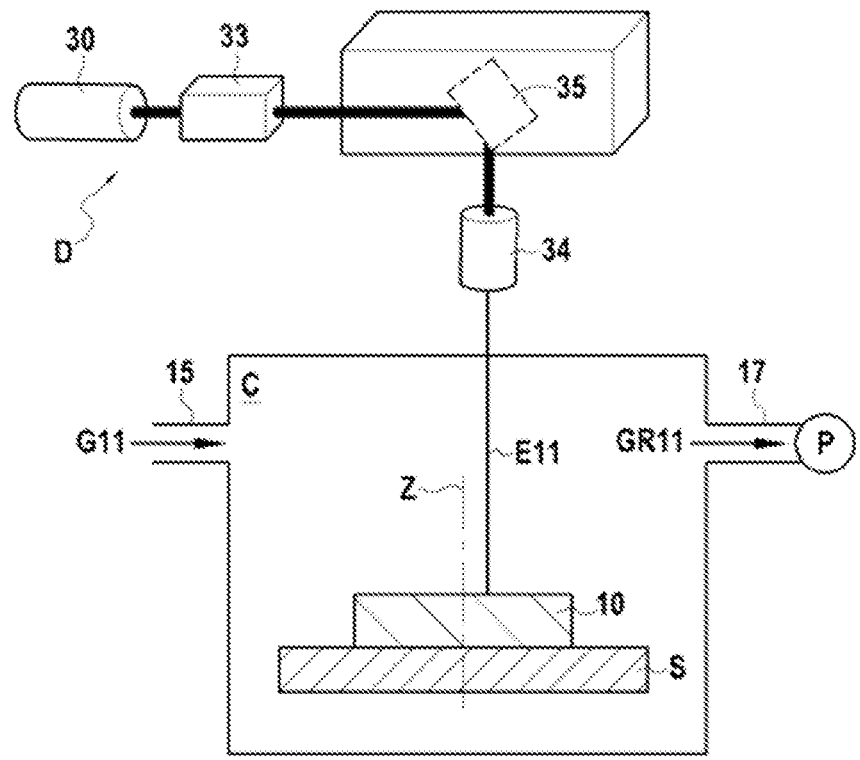
[Fig. 2]
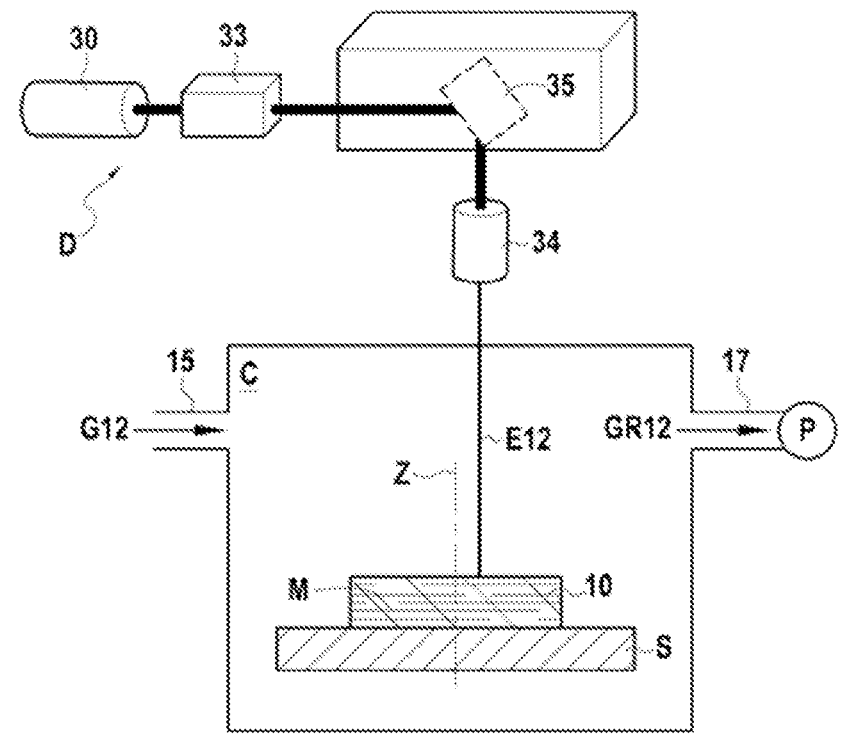

[Fig. 3]
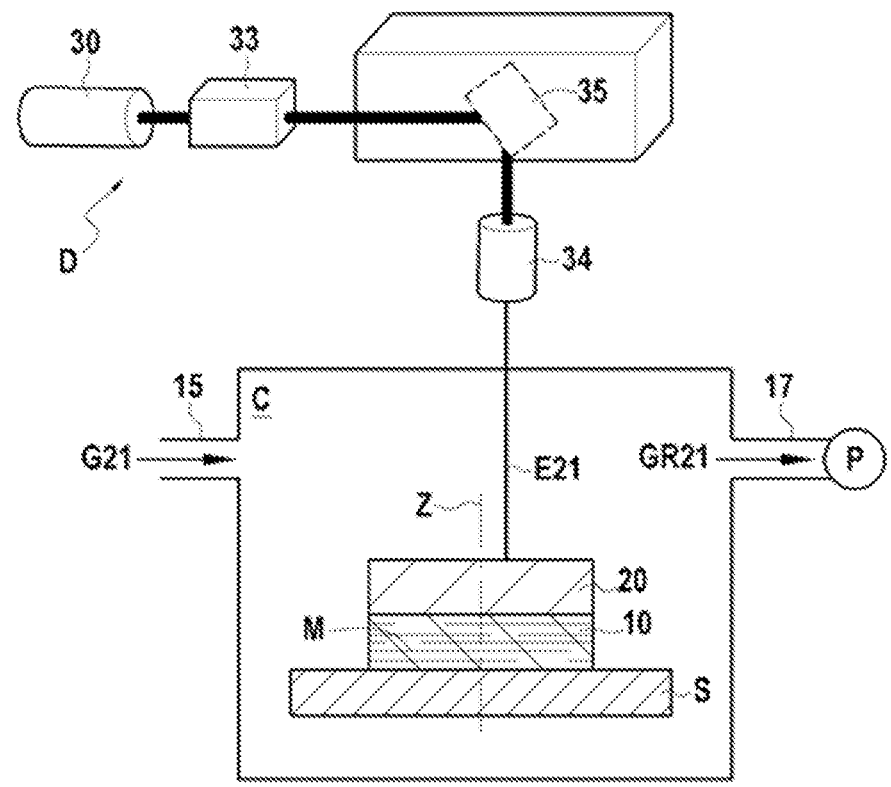
[Fig. 4]
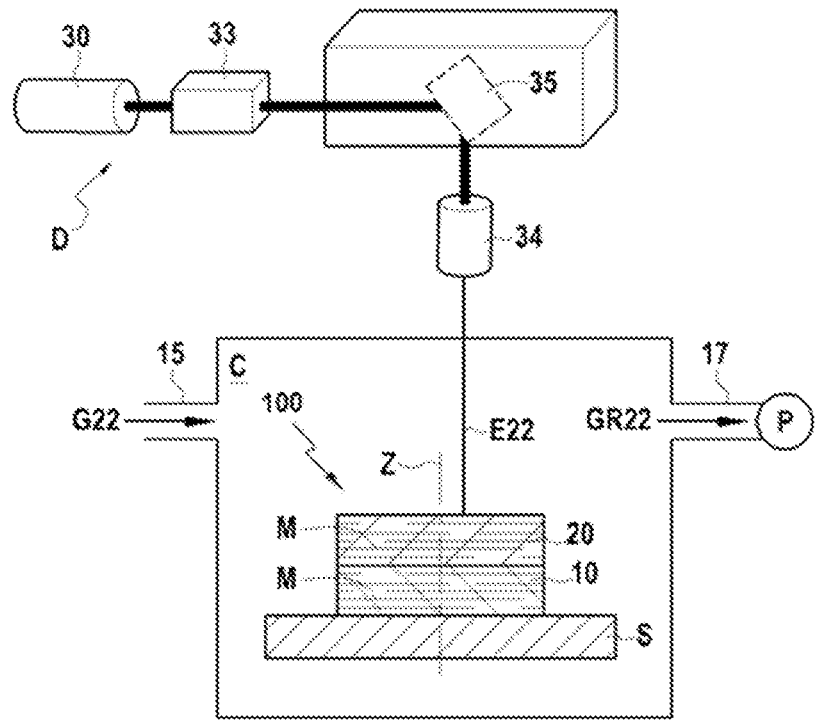

[Fig. 5]
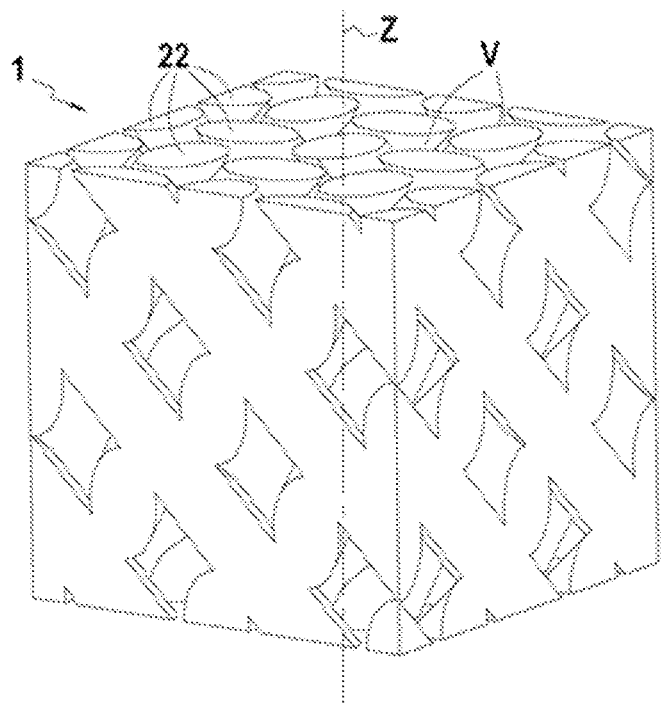
[Fig. 6]
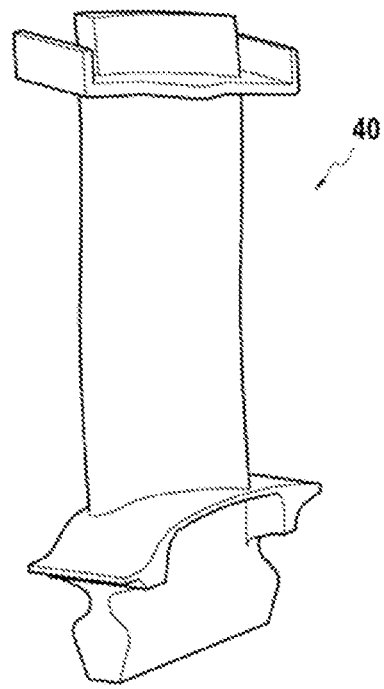

ADDITIVE MANUFACTURING PROCESS FOR PRODUCING A STRUCTURE

CROSS-REFERENCE TO RELATED APPLICATIONS

This application is the U.S. National Stage of PCT/FR2021/051281, filed Jul. 9, 2021, which in turn claims priority to French patent application number 2008320 filed Aug. 6, 2020. The content of these applications are incorporated herein by reference in their entireties.

TECHNICAL FIELD

The present invention relates to the manufacture of a reinforcement, in particular for a part made of ceramic matrix composite material (CMC material) by an additive manufacturing technique, and more specifically by Chemical Vapor Deposition assisted by focused energy radiation.

PRIOR ART

The parts made of CMC material are known to have both good mechanical properties allowing their use for structural elements and the ability to preserve these properties at high temperatures. The CMC parts include a fibrous reinforcement made of refractory fibers, typically carbon or ceramic, which is densified by a ceramic matrix, for example made of silicon carbide (SiC). The ceramic matrix composite technologies are today essentially based on the use of woven fibrous reinforcements. In addition to the high cost of refractory fibers, the weaving operation is also expensive and can present limitations in terms of geometries of parts, particularly for the parts with a small size and complex geometry, in relation to the inadequacy of the woven textile pitch.

Additive manufacturing techniques are also known which allow making metal or polymer material parts, but these techniques do not currently give entirely satisfactory results for the deposition of refractory materials, such as ceramics.

It is therefore desirable to have a method allowing the manufacture of a structure having a complex geometry and which is suitable for the deposition of a wide variety of refractory materials.

DISCLOSURE OF THE INVENTION

The invention relates to a method for manufacturing a structure by additive manufacturing, comprising at least:
the formation of a reinforcement by chemical vapor deposition assisted by focused energy radiation, the reinforcement being deposited along a deposition axis and comprising a plurality of interconnected reinforcing elements made of ceramic or carbon which define therebetween an interstitial volume having a tortuous shape along said deposition axis.

The invention proposes an additive manufacturing method in which the structure is built gradually and comprises at least one reinforcement and possibly a matrix and an interphase which are formed as the reinforcement is formed, as will be detailed below. The reinforcement as well as the matrix and the interphase, when present, are each formed by chemical vapor deposition assisted by focused energy radiation. The proposed additive manufacturing technique on the one hand implements a chemical vapor deposition in which there is transformation of one or several precursors under the effect of a localized and punctual heating produced by the focused energy radiation which allows, depending on the choice of the precursor, depositing a wide variety of materials. On the other hand, the localized heating of this (these) precursor(s) is carried out by focusing the energy radiation only at the level of the areas where the deposition of material is desired, which allows accessing complex geometries for the reinforcement and particularly for the interstitial volume between the reinforcing elements. A reinforcement of complex shape is thus obtained having an interstitial volume with a tortuous shape at least along the deposition axis, that is to say having a sinuous and non-rectilinear shape when moving along this axis. The complex shape of the reinforcement allows replacing the woven textures and leading to optimized reinforcement properties. The method according to the invention offers a great diversity in the forms accessible without implementing a fiber weaving operation to make the reinforcement and therefore by overcoming the limitations associated with this technique.

In one exemplary embodiment, the reinforcement is a 4D reinforcement. The invention is however not limited in terms of geometry for the reinforcement. According to one variant, it is possible to give another shape to the reinforcement such as a honeycomb shape for example, the shape of the reinforcement being adapted to the desired application.

In one exemplary embodiment, the method comprises an alternation between the deposition of a layer of the reinforcement and the deposition of a matrix by chemical vapor deposition assisted by focused energy radiation, the matrix being present in the interstitial volume of the reinforcement obtained.

In this case, the matrix is deposited as the reinforcement is formed. A part made of composite material with a matrix densifying the interstitial volume between the reinforcing elements is thus directly obtained.

In one exemplary embodiment, the method comprises at least:
the deposition of a first layer of the reinforcement,
the deposition of the matrix in the interstitial volume of the first layer of the reinforcement in order to obtain a first layer of the densified reinforcement, and
the deposition of a second layer of the reinforcement on the first layer of the densified reinforcement.

In this case, the matrix is deposited in the interstitial volume of a layer of the reinforcement deposited beforehand. There is nevertheless no departure from the scope of the invention in the opposite case where the matrix is deposited first and the reinforcing layer is deposited around the previously deposited matrix. Particularly, the method can further comprise the formation of an interphase on the reinforcing elements of the first layer of the reinforcement before the deposition of the matrix, the interphase being able to be formed by chemical vapor deposition assisted by focused energy radiation.

In this case, the formation of the interphase is also performed as the reinforcement and the matrix are formed.

In one exemplary embodiment, there is focusing of the energy radiation on a solid portion located in the vicinity of an area where the deposition must be performed. In this case, the focal point of the energy radiation is not in the gas phase but on a solid portion which can correspond to a substrate on which the structure is formed or to part of the structure itself on which the deposition is intended to be carried out, that is to say to a portion of the previously deposited structure. In this case, the heating of the solid portion locally transmits energy to the gaseous precursor in order to transform it and obtain the deposition. Such a characteristic allows, compared to the direct heating of the gas phase, improving the control of the location of the deposition. Such a characteristic further allows working in a cold wall reactor which allows having more flexibility on the gas pressures and the deposition temperatures while avoiding any risk of nucleation in the homogeneous phase. This allows modulating the deposition kinetics more easily.

It should be noted that it is possible, during the formation of the structure, to use a combination of a focusing of the energy radiation on a solid portion and in the gas phase. As a variant, it is possible to focus the energy radiation only on a solid portion or only in the gas phase.

In one exemplary embodiment, the focused energy radiation is a focused laser beam.

Particularly, the wavelength of the focused laser beam can be comprised between 1,058 nm and 1,068 nm, for example substantially equal to 1,063 nm.

These wavelength values in the near infrared allow obtaining maximum absorption of energy by the solid portion when focusing the laser beam thereon. The wavelengths can be lower, in the UV or the visible, in the case for example where the laser beam is focused in the gas phase.

The invention is however not limited to the use of a laser as energy radiation. As a variant, it is thus possible to use a focused electron beam.

It is thus possible to use the same gaseous precursor to form the entire reinforcement or to modify the gaseous precursor as the reinforcement is deposited. The gaseous precursor can further be modified between the deposition of the reinforcement and the deposition of the matrix and the possible interphase. The material forming the matrix and the possible interphase may be different from that of the reinforcement. It is possible, for example, to deposit a silicon carbide reinforcement, a pyrocarbon or boron nitride interphase and a silicon carbide matrix in the interstitial volume.

By way of example, the structure can include at least one of the following materials: a carbide ceramic, for example silicon carbide, a nitride ceramic, a carbonitride ceramic, an oxide ceramic, for example alumina or a ceramic of eutectic composition. Particularly, the reinforcement, the matrix and the possible interphase may, independently of each other, include a material chosen from the list indicated above.

In one exemplary embodiment, the reinforcement is a reinforcement of a turbomachine part. Particularly, the reinforcement can constitute the reinforcement of a turbomachine blade, of a nozzle or turbine ring sector. The reinforcement can constitute a reinforcement of an aircraft turbomachine part.

BRIEF DESCRIPTION OF THE DRAWINGS

FIG. 1 schematically and partially represents the deposition of a first layer of the reinforcement within the framework of an example of a method according to the invention.

FIG. 2 schematically and partially represents the deposition of the matrix in the interstitial volume of the first layer of the reinforcement of FIG. 1.

FIG. 3 schematically and partially represents the deposition of a second layer of the reinforcement on the first layer densified by the matrix of FIG. 2.

FIG. 4 schematically and partially represents the deposition of the matrix in the interstitial volume of the second layer of the reinforcement of FIG. 3.

FIG. 5 represents a 4D reinforcement obtained by implementation of an example of a method according to the invention.

FIG. 6 represents a turbomachine part obtained by implementation of an example of a method according to the invention.

DESCRIPTION OF THE EMBODIMENTS

A possible example for the deposition layer by layer of a structure by chemical vapor deposition assisted by focused energy radiation will be described in relation to FIGS. 1 to 4. The size of the layers has been exaggerated in the figures for reasons of readability. In the example illustrated, the manufactured structure comprises a reinforcement and a matrix densifying the reinforcement formed as it is deposited. According to this example, the structure is formed by alternating between the deposition of a layer of the reinforcement and the deposition of the matrix. According to one variant not illustrated and on the same principle, an interphase can further be formed on the reinforcing elements after deposition of a layer of the reinforcement and before deposition of the matrix. The structure layer by layer is formed by additive manufacturing, a layer of the structure corresponding to a segment thereof along the deposition axis and comprising, in the example considered, the reinforcement, the matrix and the interphase possibly present.

FIG. 1 illustrates the formation of a first layer 10 of the reinforcement by chemical vapor deposition assisted by focused energy radiation from a gaseous precursor G11. The first layer 10 is deposited on a support S present in a hermetic reaction chamber C, for example in contact with this support S.

Before initiation of the deposition, the reaction chamber C was purged of the traces of water and dioxygen. For this, a plurality of cycles of pumping and expansion of a gas, such as argon, can be carried out. The gaseous precursor G11 is introduced into the reaction chamber C through a gas introduction channel 15. Those skilled in the art in the art know how to choose the gaseous precursor according to the desired material to be deposited among the gaseous precursors known from conventional chemical vapor depositions. Techniques for monitoring the injection and pumping of the gaseous precursor are also part of the general knowledge and do not need to be detailed here. For example, methyltrichlorosilane ($CH_3SiCl_3$ or MTS) or monomethylsilane (MMS) can be used to deposit silicon carbide. Propane and/or methane can be used to deposit carbon. In a similar way to what can be implemented in the conventional chemical vapor deposition techniques, the gaseous precursor can be diluted in a complementary neutral or reactive gas. It is thus possible to add hydrogen and/or nitrogen to the precursor.

The gaseous precursor G11 undergoes localized heating by focused energy radiation E11 in order to deposit the first layer 10 of the reinforcement with the desired geometry. The first layer 10 deposited comprises a plurality of interconnected reinforcing elements 22 which define therebetween an interstitial volume V having a predefined and monitored shape, an example of geometry of the reinforcement will be detailed below in relation to FIG. 5. To achieve the desired geometry, the energy radiation E11 is focused successively in the areas where the deposition is desired in order to locally provide heat and locally transform the gaseous precursor G11. As mentioned above, the focal point of the energy radiation E11 can be located at the level of a solid portion, for example at the level of the support S or of part of a deposition previously carried out, in order to cause its heating and cause the transformation of the precursor G11 nearby and thus carry out the deposition of the material.

According to a non-preferred variant, the focal point of the energy radiation E11 can be directly located in the gaseous precursor G11.

In the example illustrated, the energy radiation E11 comes from a laser. The system illustrated according to this example comprises an irradiation device D which comprises a laser source 30, a collimator 33, an optical scanner 35 which allows orienting the laser beam during the method as well as a focusing device 34, such as a lens, making it possible to focus the laser beam in the area where the deposition must be carried out. The laser source can be a source in the infrared having a wavelength comprised between 1,058 nm and 1,068 nm, for example a source of the fiberizable photodiode Yb type. As a variant, the wavelength of the laser is in the ultraviolet or in the visible, in particular in the case of direct heating of the gas phase. The laser source 30 can operate in continuous mode preferentially, or in discontinuous mode if it is desired to avoid providing too much surface power. There is nevertheless no departure from the scope of the invention if an energy source other than a laser is used such as an electron beam. In the different cases envisaged, the focusing of the heat source is done in a manner known to those skilled in the art by using optical or electromagnetic focusing devices. Whatever the nature of the energy radiation used, the power of the focused energy radiation can be comprised between 1 mW and 100 W, preferably between 20 mW and 5 W. The focused energy radiation E11 can be moved to carry out the deposition of the first reinforcement layer 10 with the desired geometry by modifying the position and/or the inclination of the optical scanner 35. A device for monitoring the irradiation (not represented) allows monitoring the movement of the energy radiation E11. This thus allows carrying out a scan by the focused energy radiation E11 in predefined areas where the deposition of the constituent material of the first layer 10 must be carried out. The means for moving the focused energy radiation are similar to those used in the Selective Laser Molding (SLM) technology. It will be noted that in addition to or instead of moving the focused energy radiation E11, it is possible to move and/or tilt the support S during the deposition. A support monitoring device (not represented) allows achieving this movement or this inclination. The support S can thus be movable along at least one direction in space, for example and preferably along the vertical direction Z, or even along the three directions in space. As a variant or in combination, the support S can be titled around at least one of the directions in space, or even around each of them. There is nevertheless no departure from the scope of the invention if the support S remains fixed and the deposition of the first layer 10 is only obtained by a movement of the focused energy radiation E11 in a plurality of predetermined areas.

As an indication, the pressure in the reaction chamber C during the formation of the structure can be comprised between 5 mbar and 3 bar, for example between 5 mbar and 15 mbar or between 1 bar and 3 bar. The reaction chamber C can include a pressure sensor (not represented) as well as a pumping device P in order to respectively measure and adjust the pressure in the reaction chamber C as the structure is deposited. The reaction chamber C comprises a gas outlet channel 17 through which the residual gaseous precursor GR11 and the reaction by-products are pumped out of the reaction chamber. It is possible, if desired, to use a separator device, such as a chromatographic system, to separate and reinject the precursor into the chamber C and reject the by-products. The pressure in the reaction chamber C and the surface power of the energy radiation implemented are determined by those skilled in the art depending on the nature of the precursor used in order to adapt the deposition kinetics. The reaction chamber C may further include a thermal sensor (not represented), such as a thermal camera, in order to measure the local temperature at the focal point of the energy radiation, as well as a regulation device that allows, depending on the measurement from the thermal sensor, modifying the power of the focused energy radiation in order to apply the desired predefined power to transform the precursor and carry out the deposition.

The deposition of a first layer 10 of the reinforcement has just been described in relation to FIG. 1. In the example considered, the deposition of the reinforcement is temporarily interrupted in order to form the matrix M in the interstitial volume of the first layer 10 previously formed as will now be described in relation to FIG. 2.

Once the first layer 10 of the reinforcement has been deposited, the irradiation by the focused energy radiation E11 is interrupted and the reaction chamber C is purged. A gaseous precursor G12 intended to form the matrix M in the interstitial volume of the first layer 10 by chemical vapor deposition assisted by focused energy radiation is then introduced into the reaction chamber C. The precursor G12 can be different from the precursor G11 and lead to the deposition of a matrix M formed of a material different from that of the first layer 10 of the reinforcement. In order to carry out the deposition of the matrix M in the desired areas, the energy radiation E12 and/or the support S are driven in a manner similar to what has just been described above for the first layer 10. The surface power of the energy radiation E12 can be different from that of the energy radiation E11 by being adapted to the precursor G12. The monitoring of the pressure in the reaction chamber and the treatment of the residual matrix precursor GR12 and by-products mixture can be as described above for the case of the deposition of the first layer 10.

The matrix M can comprise, or be mainly composed by mass of a carbide, nitride or oxide ceramic. The matrix can for example comprise silicon carbide or be mainly composed by mass of silicon carbide.

In one variant not illustrated, an embrittlement-release interphase is similarly deposited on the reinforcing elements of the first layer of the reinforcement before formation of the matrix also by chemical vapor deposition assisted by focused energy radiation. The interphase can be monolayered or multilayered. This interphase can comprise for example silicon carbide, boron nitride, boron nitride doped with silicon BN(Si) or pyrocarbon PyC. The interphase has a function of embrittlement-release of the composite material which promotes the deflection of any cracks reaching the interphase after having propagated in the matrix, preventing or delaying the rupture of the reinforcement.

After the deposition of the matrix M in the interstitial volume of the first layer 10 of the reinforcement, the deposition of the reinforcement is resumed by depositing a second layer 20 of the ceramic or carbon reinforcement on the first layer 10 densified by the matrix M, as illustrated in FIG. 3.

The irradiation by the focused energy radiation E12 is interrupted and the reaction chamber C is purged. A gaseous precursor G21 intended to form the second layer 20 of the reinforcement by chemical vapor deposition assisted by focused energy radiation is then introduced into the reaction chamber C. The focused energy radiation E21 is applied in order to deposit the second layer 20 of the reinforcement at the desired geometry on the first layer 10, similarly to what was described above. The characteristics described above for the deposition of the first layer 10 remain applicable to the deposition of the second layer 20. It will be noted that the precursor G21 may be identical to or different from the precursor G11. The material of the second layer 20 of the reinforcement may be identical to or different from the material of the first layer 10 of the reinforcement. Preferably, the material of the second layer 20 of the reinforcement is identical to the material of the first layer 10 of the reinforcement. The surface power of the energy radiation E21 may be identical to or different from that of the energy radiation E11. The monitoring of the pressure in the reaction chamber and the treatment of the residual precursor GR21 and by-products mixture can be as described above for the case of the deposition of the first layer 10.

During the deposition of the second layer 20, the energy radiation E21 can scan a set of areas defining a different pattern with respect to the pattern defined by the set of areas scanned by the energy radiation E11 during the deposition of the first layer 10. The second layer 20 is superimposed on the first layer 10, here along a deposition axis materialized by the vertical direction Z. The second layer 20 can be deposited in contact with the first layer 10. The second layer 20 can substantially cover the entire first layer 10, or only part of it. The second layer 20 comprises a plurality of interconnected reinforcing elements made of ceramic or carbon, which define therebetween an interstitial volume with a different shape from the shape of the interstitial volume between the reinforcing elements of the first layer 10, so as to give a tortuous shape to the interstitial volume of the reinforcement 1 along the deposition axis Z. The shape of the interstitial volume of the second layer 20 can be substantially different from that of the interstitial volume of the first layer 10, in order to correspond to the desired orientation of the reinforcement.

Once the second layer 20 of the reinforcement has been deposited, the irradiation by the focused energy radiation E21 is interrupted and the reaction chamber C is purged. A gaseous precursor G22 intended to form the matrix M in the interstitial volume of the second layer 20 by chemical vapor deposition assisted by focused energy radiation is then introduced into the reaction chamber C (FIG. 4). The method is then continued as described above to deposit the matrix M in the interstitial volume of this second layer 20 by driving the focused energy radiation E22 and/or the support S to deposit the matrix M in the desired areas. The residual precursor GR22 and by-products mixture can be treated as described above. As indicated above, an interphase can be deposited on the reinforcing elements of the second layer 20 before deposition of the matrix M.

A composite material structure 100 comprising a reinforcement 1 and a matrix M densifying the reinforcement is then obtained. The reinforcement volume ratio in the structure can be comprised between 15% and 55%, for example between 25% and 35%. The reinforcement ratio is controlled and the reinforcement is oriented in space according to the loading directions of the part to be obtained.

The example illustrated showed the manufacture of a structure 100 in which two layers 10 and 20 of the reinforcement are deposited. Of course, the method can continue by depositing, in a similar manner, a third layer of the reinforcement on the second layer 20. The interstitial volume of each of the deposited layers can have a different shape in order to give the interstitial volume of the reinforcement a tortuous shape.

An example has just been described where there is formation of a structure in which the matrix is formed as the reinforcement is formed. The formation of this matrix is nevertheless optional, the reinforcement being simply able to be formed layer by layer without forming a matrix in a concomitant manner, or simply by forming an interphase as the reinforcement is formed. According to variants, the matrix and/or the interphase can be formed after formation of the reinforcement by known techniques.

An example of geometry of reinforcement 1 which can be obtained by implementation of the invention will now be described in relation to FIG. 5. The reinforcement 1 illustrated in FIG. 5 corresponds to a 4D reinforcement. The reinforcement 1 comprises a plurality of reinforcing elements 22 oriented along the four directions given by the diagonals of a cube, and defining therebetween an interstitial volume V with a tortuous shape along the vertical direction Z of deposition. The reinforcing elements 22 can have various shapes, such as parallelepipeds, girders having for example a circular, elliptical, square or rectangular section, spheres, ellipsoids, etc. The reinforcing elements 22 can be solid or hollow. The diameter of the reinforcing elements 22 can be less than or equal to 100 µm. The reinforcing elements 22 can further be arranged in a mesh to form the reinforcement. Whatever the embodiment considered, the reinforcement 1 has a connected interstitial volume, that is to say there is a path that allows moving from one space between reinforcing elements 22 to another without passing through the material of the reinforcing elements. The interstitial volume is delimited by an inner surface of the ceramic or carbon material. As the interstitial volume is connected, this inner surface of the ceramic or carbon material is continuous in the structure. Those skilled in the art will recognize without difficulty that structures other than a 4D reinforcing structure are possible.

FIG. 6 illustrates an example of a part that can be obtained by implementation of the method according to the invention. The invention can allow forming a turbomachine part, for example an aeronautical turbomachine part. It is possible, as illustrated in FIG. 6, to form a turbine blade 40. Other examples are possible, such as a turbine ring sector or a turbine nozzle sector, for example.

The expression "comprised between . . . and . . . " must be understood as including the bounds.

The invention claimed is:

1. A method for manufacturing a structure by additive manufacturing, comprising:
    forming a reinforcement by chemical vapor deposition assisted by focused energy radiation, the reinforcement being deposited along a deposition axis and comprising a plurality of interconnected reinforcing elements made of ceramic or carbon, said interconnected reinforcing elements being formed by chemical vapor deposition assisted by focused energy radiation from at least one gaseous precursor, and the interconnected reinforcing elements as formed by the chemical vapor deposition assisted by focused energy radiation from at least one gaseous precursor defining therebetween an interstitial volume having a tortuous shape along said deposition axis, said interstitial volume having a sinuous and non-rectilinear shape when moving along said deposition axis.

2. The method according to claim 1, wherein the reinforcement is a 4D reinforcement.

3. The method according to claim 1, wherein there is focusing of the energy radiation on a solid portion located in the vicinity of an area where the deposition is performed.

4. The method according to claim 1, wherein the reinforcement includes at least one of the following materials: a carbide ceramic, a nitride ceramic, a carbonitride ceramic, an oxide ceramic or a ceramic of eutectic composition.

5. The method according to claim 1, wherein the reinforcement is a reinforcement of a turbomachine part.

6. The method according to claim 1, wherein at least two layers each defining an interstitial volume with a different shape are deposited by chemical vapor deposition assisted by focused energy radiation to form the tortuous shape of the interstitial volume of the reinforcement.

7. The method according to claim 1, comprising an alternation between the deposition of a layer of the reinforcement and the deposition of a matrix by chemical vapor deposition assisted by focused energy radiation, the matrix being present in the interstitial volume of the reinforcement obtained.

8. The method according to claim 7, comprising:
depositing a first layer of the reinforcement,
depositing a matrix in the interstitial volume of the first layer of the reinforcement in order to obtain a first layer of the densified reinforcement, and
depositing a second layer of the reinforcement on the first layer of the densified reinforcement.

9. The method according to claim 8, further comprising forming an interphase on the reinforcing elements of the first layer of the reinforcement before the deposition of the matrix, the interphase being formed by chemical vapor deposition assisted by focused energy radiation.

10. The method according to claim 1, wherein the focused energy radiation is a focused laser beam.

11. The method according to claim 10, wherein a wavelength of the focused laser beam is comprised between 1,058 nm and 1,068 nm.

\* \* \* \* \*